(12) United States Patent
Pfaff

(10) Patent No.: US 7,346,199 B2
(45) Date of Patent: Mar. 18, 2008

(54) ANATOMIC TRIANGULATION

(75) Inventor: J. Martin Pfaff, Bell Canyon, CA (US)

(73) Assignee: Intuitive Software, Inc., Bell Canyon, CA (US)

( * ) Notice: Subject to any disclaimer, the term of this patent is extended or adjusted under 35 U.S.C. 154(b) by 778 days.

(21) Appl. No.: 10/065,926

(22) Filed: Nov. 30, 2002

(65) Prior Publication Data

US 2004/0105574 A1   Jun. 3, 2004

(51) Int. Cl.
G06K 9/00 (2006.01)
A61B 5/00 (2006.01)

(52) U.S. Cl. .................. 382/128; 382/305; 600/425

(58) Field of Classification Search ............. 382/128, 382/130–133, 305; 600/424–427
See application file for complete search history.

(56) References Cited

U.S. PATENT DOCUMENTS

| | | | |
|---|---|---|---|
| 4,722,056 A | 1/1988 | Roberts et al. | 600/130 |
| 4,987,412 A | 1/1991 | Vaitekunas et al. | 345/635 |
| 5,099,846 A | 3/1992 | Hardy | 600/407 |
| 5,398,684 A | 3/1995 | Hardy | 600/391 |
| 5,519,485 A | 5/1996 | Ohtani et al. | 345/424 |
| 5,531,227 A | 7/1996 | Schneider | 600/425 |
| 5,531,520 A | 7/1996 | Grimson et al. | 382/131 |
| 5,678,546 A | 10/1997 | Truppe | 600/426 |
| 5,740,802 A | 4/1998 | Nafis et al. | 600/407 |
| 5,823,958 A | 10/1998 | Truppe | 600/426 |
| 5,954,650 A | 9/1999 | Saito et al. | 600/425 |
| 5,999,840 A | 12/1999 | Grimson et al. | 600/424 |
| 6,149,592 A | 11/2000 | Yanof et al. | 600/427 |
| 6,351,573 B1 | 2/2002 | Schneider | 382/294 |
| 6,362,821 B1 | 3/2002 | Gibson et al. | |
| 6,396,940 B1 | 5/2002 | Carrott et al. | 382/128 |

Primary Examiner—Duy M. Dang
(74) Attorney, Agent, or Firm—Jeffer Mangels Butler & Marmaro LLP (57) ABSTRACT

A method for providing image correlation between the images displayed on a PACS system, the method including the steps of: displaying a first image from a first stack of images and a second image from a second stack of images, each stack of images belonging to a different series of image captures for a subject from a particular orientation; determining a spatial location of each image in the first and second stacks of images; receiving a selection signal for an image in the first stack of images; determining a corresponding image in the second stack of images based on the selection signal and the spatial location of the corresponding image; and, displaying the corresponding image. An apparatus for displaying correlated images based on anatomic triangulation.

27 Claims, 5 Drawing Sheets

CORONAL
ORIENTATION

AXIAL
ORIENTATION

SAGITTAL
ORIENTATION

ANATOMIC TRIANGULATION

BACKGROUND OF INVENTION

The present invention concerns a method and apparatus for displaying images, and more particularly to a method and apparatus for displaying anatomically correlated images.

In the past, physicians have made their diagnoses based on the evaluation of anatomical images displayed on film. These images, once developed on film, were "static" and not easily enhanced by image processing techniques. In addition, film had to be distributed by courier or some other physical means, which added to the delay before the images were available for use by a physician.

Modern Picture Archiving and Communications Systems (PACS) store images in a digital format, which allow physicians greater control over the images and provide the ability for these images to be displayed on high-resolution computer monitors. PACS also provide efficiencies of distribution and storage that were heretofore unavailable with film.

A PACS type of system also allows greater control over which images are displayed, and the physician interface has evolved over the last few years to make image navigation easier and more efficient. Techniques such as "grouping common orientations," which allows the physician to scroll through multiple stacks of images of the same acquisition orientation (e.g., either in an axial, sagittal, coronal or oblique orientation)concurrently, have become commonplace.

The common orientation grouping technique allows the physician to identify an abnormality in one image, and then confirm the diagnosis in another image from another stack of images acquired at the same anatomic location and orientation but with a different imaging technique or technology. As used herein, a "stack" of images is a sequence of images captured or "acquired" in one session, with all images in the stack having the same orientation. A "series" of images includes one or more stacks, with each stack in the series being acquired using a different technique or technology, but still with all images having the same orientation.

For example, one imaging technique is a double-echo capture, where the same shot is captured at two different times of the same "exposure." The resulting image series thus includes a stack of images captured at a first time instance, T1 (i.e., the first echo), and a corresponding stack of images captured at a second time instance, T2 (i.e., the second echo). Abnormal cells, such as those belonging to a tumor, image differently from other cells (e.g., the abnormal cells being either lighter or darker than the surrounding cells in images) depending on when the images are taken, and therefore might be easier to identify in one particular series of images. Thus, where the physician sees an abnormality while examining the series of images captured at T1, the physician can view a corresponding image from the series of images captured at T2 to help confirm the diagnosis.

During a medical procedure, know as an "exam," many series are acquired at different orientations, and with different imaging techniques to demonstrate the anatomy from many perspectives. Each stack of images, whether they differ in being acquired with just a different technique, or a different orientation, may be displayed in a separate window, by which Anatomic Triangulation can be used to synchronize the anatomic region.

The process of identifying a corresponding image in a second stack of images based on a displayed image in a first stack of images is referred to as "image correlation." The ease and speed of image correlation is very important as it allows the physician to be more efficient in the diagnostic process, in addition to improving diagnostic accuracy. Moreover, the image navigational issues have become critically important due to the large number of images currently being acquired on state-of-the-art medical scanners. Today, it is not uncommon for a computed tomography (CT) or Magnetic Resonance Imaging (MRI) scanner to acquire thousands of images in one session, or "exam," making image identification and display a significant issue. However, current techniques are based on navigation through stacks of images with only one-dimensional image correlation (i.e., grouping of common orientations) being applied to date. This "1-axis correlation," used on most image display systems to help-reduce the effort required to evaluate the large number of acquired diagnostic images, is limited to assisting the physician in navigating through corresponding stacks of images, but only where the corresponding stacks of images are in the same orientation.

With cases becoming larger and larger (i.e., more and more images being acquired in each series of captures), physicians are spending more time navigating these large cases and trying to locate corresponding anatomic locations in many acquisition orientations, and impacting the total time they can spend on each case. Accordingly, there is a need for a better system for image correlation.

SUMMARY OF INVENTION

The present invention provides a method for providing image correlation, or "anatomic triangulation," between the images displayed on a PACS system. In one embodiment, the method includes the steps of displaying a first image from a first stack of images and a second image from a second stack of images, each stack of images belonging to a different series of image captures for a subject from a particular orientation; determining a spatial location of each image in the first and second stacks of images; receiving a selection signal for an image in the first stack of images; determining a corresponding image in the second stack of images based on the selection signal and the spatial location of the corresponding image; and, displaying the corresponding image.

The present invention also provides a display system having a display, a processor coupled to the display, and a memory coupled to the processor, with the memory configured to allow the processor to: (i) display an image from a first series of image captures for a subject in a first orientation on the display; (ii) receive a selection signal directed to the image; and, (iii) display a corresponding image from a second series of image captures for the subject in a second orientation on the display based on the selection signal.

The present invention further provides a computer usable medium having a computer readable program code contained therein, the computer readable program code comprising: (i) computer readable code for displaying a first and second stacks of images, each stack of images belonging to a different series of image captures for a subject from a particular orientation; (ii) computer readable code for determining a spatial location of each image in the first and second stacks of images; (iii) computer readable code for receiving a selection signal for an image in the first stack of images; (iv) computer readable code for determining a corresponding image in the second stack of images based on the selection signal and the spatial location of the corresponding image; and, (v) computer readable code for displaying the corresponding image.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF DRAWINGS

The invention may be more readily understood by referring to the accompanying drawings in which.

Like numerals refer to like parts throughout the several views of the drawings.

DETAILED DESCRIPTION

The present invention significantly improves existing 1-dimensional image correlation and display approaches by providing a 3-dimensional correlation (i.e., "triangulation") between the views of different acquisition orientations based on a user-specified anatomical location in one of the views and displaying the images closest to the user-specified location. Anatomic interpretation for the physician is made easier and faster because all the images are automatically updated to display the various views of the selected anatomic region. For example, image navigation is improved by allowing the physician to point to a nerve ending (or other anatomic feature) in one image, and having that same anatomic location displayed automatically in all the other acquired orientations. Since most planar imaging systems acquire multiple orientations to help evaluate the anatomy from many perspectives, the "anatomic triangulation" approach aids the physician when performing such tasks as pathology.

In addition to the "static" localization of anatomic regions, the present invention also employs dynamic triangulation to allow the physician to "tour" anatomic structures by using a cursor or other user interface to navigate a particular anatomic structure in one orientation and have the corresponding anatomic regions displayed for each of the other orientations in real-time. Dynamic localization improves the physician's ability to characterize the size, shape, and morphologic features of a particular tumor or other pathology. This real-time localization or "anatomic display" allows the physician to quickly navigate through complex acquisitions and evaluate the anatomy in question, rather than spending time trying to coordinate an "image-based" display system.

The general process for one embodiment of the anatomic triangulation process includes:

1) Acquiring different series of images, or scans, of medical images, each series being taken of an anatomy of interest in a particular orientation.

2) Displaying multiple windows on a PACS-capable system, each showing an image from a "stack" of images in a particular orientation of the anatomy of interest.

3) The physician, using a cursor control device such as a mouse, position the cursor over a desired point in the anatomy (maybe a lesion or tumor) and press down on the mouse button. The coordinates (i.e., three dimensional location) of this desired point will be used to synchronize all the other windows (i.e., the other anatomic orientations) to display the same anatomic region.

4) To determine the coordinates of the desired point, the identity of the image that is being displayed in the window is first determined. The determination of the image combined with the cursor (x,y) location, will provide the location of the 3 dimensional anatomic point, also referred to as the "localizer point."

5) Determine the x and y position of the cursor location for the localizer point.

6) Convert this cursor pixel location x and y coordinates to anatomic image coordinates (RAS) using display parameters such as the pixel dimensions, the image offset, any applied image clipping, and the image magnification factor.

7) Based on the anatomic coordinates, calculate the intersecting or closest image plane to this location for each other series displayed in a separate window. Automatically display this image in all the other windows so that the same region of the anatomy is synchronized between all windows.

8) For each displayed window, calculate the x and y anatomic coordinates closest to the original cursor position (localizer point). Knowing the magnification factor and pixel dimensions of each window, calculate the x and y offsets in pixel dimensions and display a marker (e.g., a circle) at the intersecting point of the anatomy displayed in each window. In one embodiment, the color is chosen to be "yellow/black" to show up easily in light or dark image features. This shows the interpreting radiologist or physician exactly where the anatomic location is in all the other image orientations displayed.

The anatomic triangulation functionality also allows dynamic display functionality. If the user drags the cursor with the left mouse button depressed, and follow an anatomic feature in any of the windows, as the mouse is moved, all other windows will dynamically synchronize to the current location of the mouse as it is moved over the anatomy. Within each synchronized window, the localizer point will be displayed showing the exact location. This allows the physician to navigate easily through complex acquisitions based on the anatomy, and not just display images in the order acquired.

It is to be noted that an important feature provided by the present invention is the ability to show anatomic locations independent of window size, magnification, image orientation, and clipping applied.

Figure 1A:
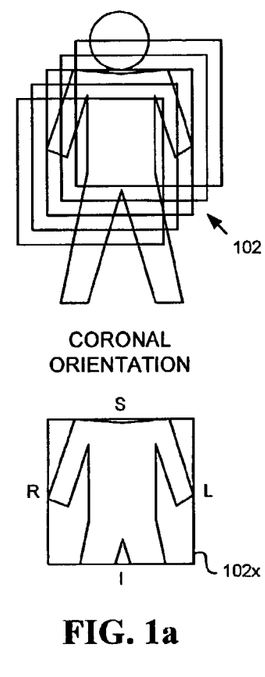
FIGS. 1a-1c illustrates three common types of orientations for image acquisitions.
Figure 1B:
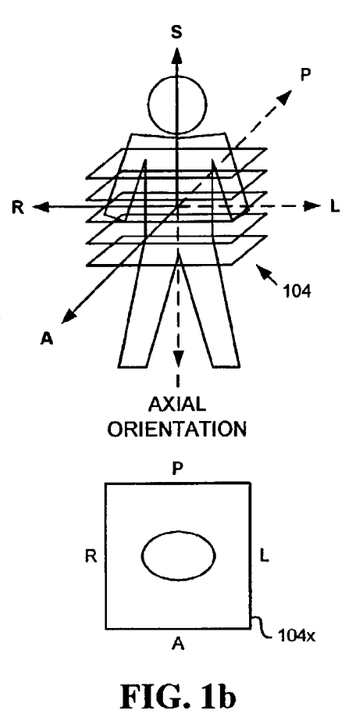
Figure 1C:
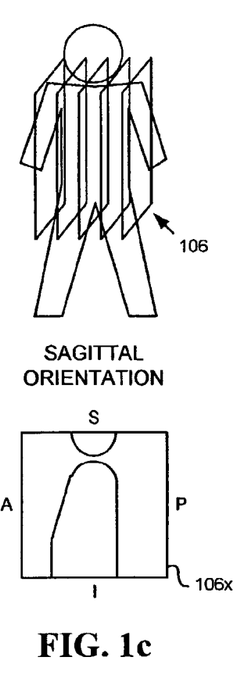

FIGS. 1a-1c illustrate three common image acquisition orientations, with FIG. 1a showing how a series of images 102 would be taken with a coronal orientation; FIG. 1b showing how a series of images 104 would be taken with an axial orientation; and FIG. 1c showing how a series of images 106 would be taken with a sagittal orientation. FIGS. 1a-1c also illustrates the labels given to each of the axes, including Right/Left, Anterior/Posterior, and Superior/Inferior, generally referred to as "RAS," with coordinates referred to as "RAS coordinates." Further, a representative image for each of the orientations is shown in FIGS. 1a-1c as 102x, 104x, and 106x, respectively. In one embodiment of the present invention, displays are measured by pixels in a x coordinate and a y coordinate, while images are measured in centimeters in RAS coordinates.

Figure 2:
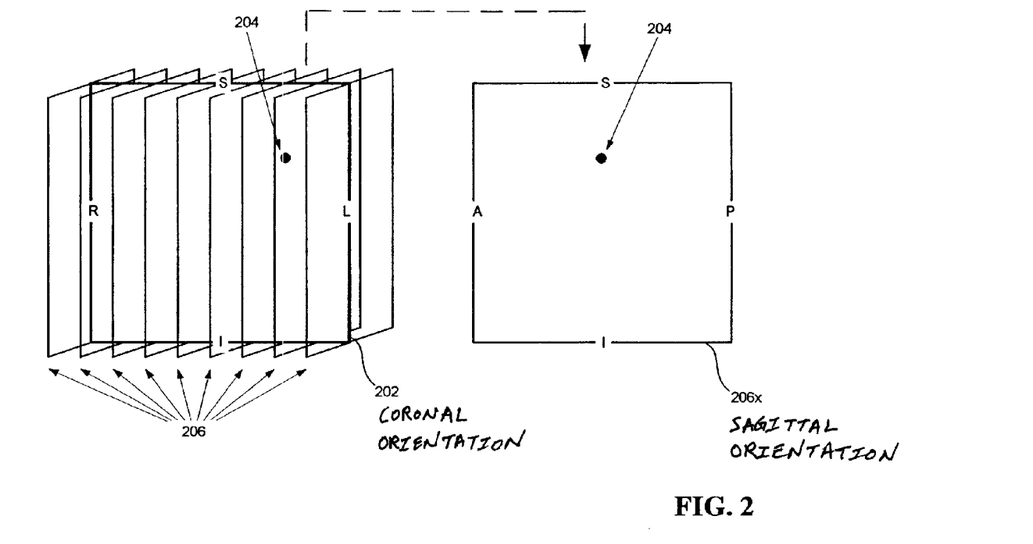
FIG. 2 illustrates the spatial relationship between the images of two of the three types of acquisition orientations of FIGS. 1a-1c.

FIG. 2 is provides an example of the concepts used in the present invention by illustrating the selection of a second image 206x from a stack of images 206 based on a localizer point 204 in a localizer image 202. As used herein, the term "localizer" also refers to a point or an image that is used to identify the image to be displayed in each of the other stacks. As seen in FIG. 2, localizer image 202 is an image acquired with a coronal orientation and contains localizer point 204, with stack 206 being acquired with a sagittal orientation. Although all images in stack 206 intersect localizer image 202, the physician is mainly interested in the image that intersects localizer point 204. Thus, as further described in detail below, the program provided by the present invention will determine that image 206x is the closest image to the localizer point, and display image 206x along with localizer image 202.

Figure 4:
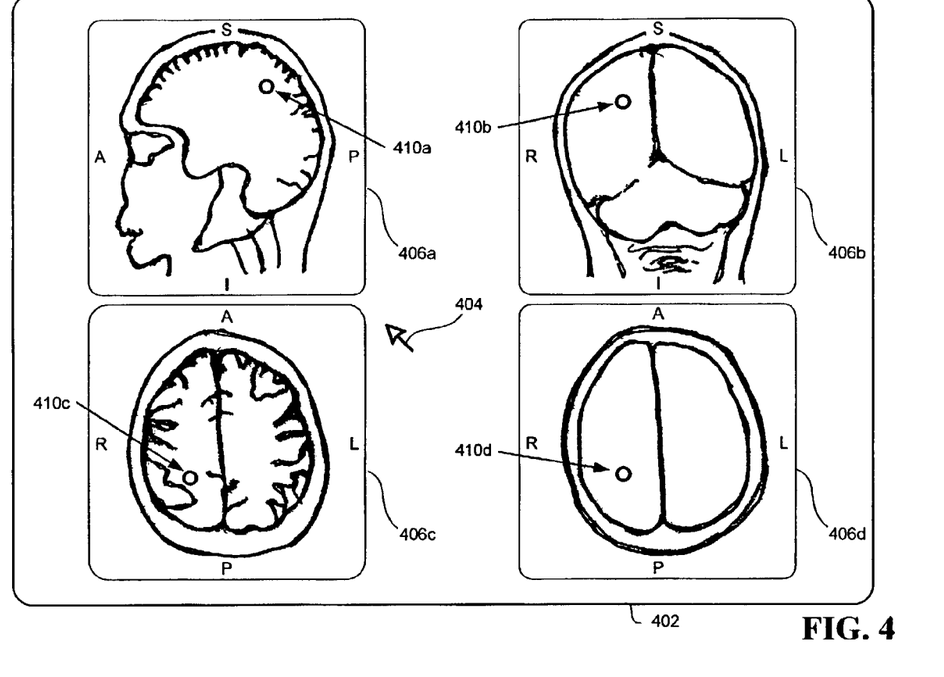
FIG. 4 is a computer display screen containing multiple windows where each window is displaying an image from a different stack of images.

FIG. 4 contains four different windows 406a-406d, each showing an image from a particular stack of images. As discussed herein, each stack of images include a set of medical images, generally referred to as a "series," with common characteristics such as a common orientation. These series are prescribed and acquired (i.e., captured) as a sequence at the scanner. Each sequence is prescribed from the localizer and acquired in a particular orientation to cover the anatomic region. The orientations, along with the pulse sequences, are designed to best delineate the anatomic information and improve diagnostic capabilities. Planar images (e.g., magnetic resonance imaging images), as opposed to projection images (e.g., X-Ray images), are acquired as a stack of images covering a 3 dimensional volume. The images (2 dimensional planes containing anatomic information) usually are also acquired sequentially at a known spacing to cover the anatomic volume prescribed from the localizer. Other planar imaging technology includes positron emission tomography and computed tomography.

In one preferred embodiment, each image has known dimensions and a specific location in space specified in the header of the image. In one embodiment, the present invention conforms with the Digital Image Communications in Medicine (DICOM) standard, version PS 3.1-2001, as published by the National Electrical Manufacturers Association and incorporated herein by reference in its entirety. The location, dimensions, and orientation information of the image are specified by a number of parameters, including the image width and height in pixels, coordinates of each corner of the image in anatomic dimensions, the center R, A, S coordinates, and the normal vector to the image plane in anatomic dimensions (related to the orientation of the patient—i.e., RAS: Right/left, Anterior/posterior, Superior/inferior). Calibrated pixel dimensions, specified in the DICOM header or calculated from the anatomic corner coordinates, will allow accurate measurements of anatomic distance to be calculated. In addition, a combination of the image coordinates, normal vectors, pixel dimensions, and inter-slice spacing allows exact three-dimensional coordinates to be calculated from any point in any image.

In one embodiment, anatomic coordinates are derived from the scanner's coordinate system, assuming that the patient does not move substantially during the exam. The patient orientation (e.g., Supine/Prone, Head-first/Feet-first) must also be defined so that the RAS coordinates of the images accurately reflect the patient's anatomic coordinates. Once these steps are taken, the coordinates of each series relate to each other and a known position within the patient, and allow inter-series spatial calculations and operations. Dynamic cross-referencing, which allows the indication of each intersecting image using colored lines displayed on each image window, is an example of this type of functionality.

Thus, in one embodiment, each image contains the relational parameters necessary to make decisions about anatomic locations. These parameters may be extracted directly from the DICOM header of the image, or maintained in a database for easy access. A minimum of three anatomic points is required to determine the image plane's location in space and relationship to all other images. This, combined with the width and height of the image in pixels, allows the application to display and determine the anatomic location of any point located by the cursor. From the 3 points and the width and height, pixel dimensions can be calculated. Also the normal to the plane and center of the image can be easily obtained from these 3 points.

Referring again to FIG. 4, window 406a displays an image from a stack of images captured with a sagittal orientation; window 406b displays an image from a stack of images captured with a coronal orientation; while windows 406c and 406d each displays an image from a different stack of images captured with an axial orientation. As seen in FIG. 4, certain features of the subject are more prominently displayed in the image shown in window 406c than in the image shown in window 406d to illustrate how different stacks of images, even if they are captured in the same orientation, may differ in the details they present to the physician.

In accordance with one embodiment of the present invention, screen 402 displays the images corresponding to the selected anatomical location, where the user has already moved the cursor 404 to the location now occupied by localizer point 410a and has also already provided a selection signal (e.g., the user has clicked the mouse) as the user detected a point of interest in the view of window 406a. The other images in windows 406b-406d are shown to be updated based on the user selection to arrive at screen 402 to show the same anatomical region from different orientations. Thus, for example, the user can determine the size of the abnormality in 3-dimensions.

Figure 5:
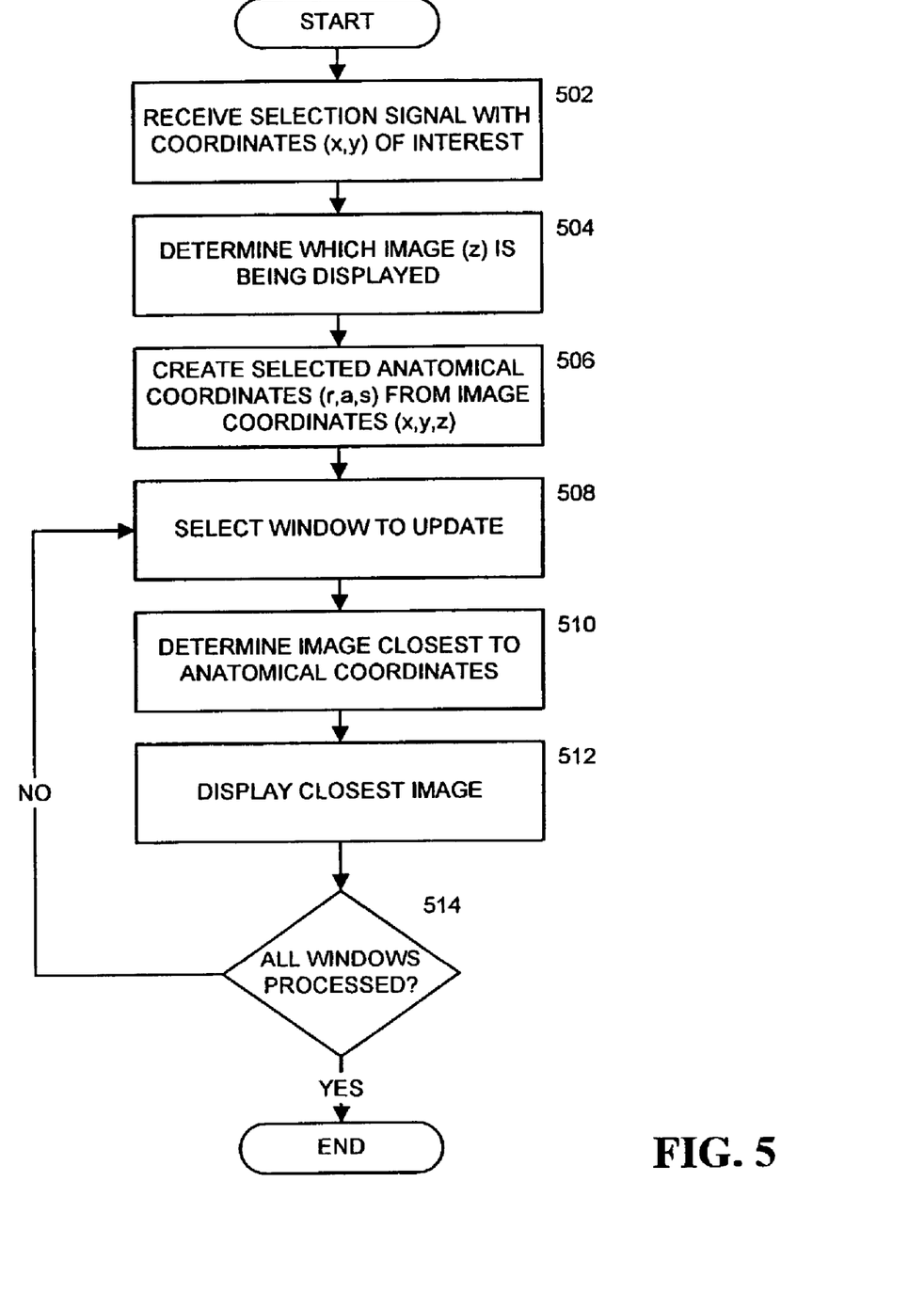
FIG. 5 is a flow chart illustrating a preferred method of operation of the present invention.

FIG. 5 is a flow chart illustrating the operation of the display system in accordance with one embodiment of the present invention.

In step 502, a selection signal is received by the computer system. In one embodiment, the selection signal is generated by the user using a cursor control device such as a mouse to click on an area of interest in the anatomy displayed in one of the windows on the screen. The received signal will include an x coordinate and a y coordinate for the selection location of the cursor (i.e., the location of the cursor when the user clicked the mouse button).

For example, in FIG. 4, the user moves cursor 404 to an area of interest (e.g., around indicator 410) and clicks on window 406d, window 406d being used to display a stack of images, with one image of the stack being displayed at any one time in the window. As described above, in the preferred embodiment, each stack of images only contain one particular orientation. Thus, a window used to display images for a particular stack of acquired images would only show that orientation of the anatomy.

In step 504, the program determines which image is being displayed. Specifically, in one embodiment of the present invention, the system determines which window contains the image the user has clicked on, and then determines the image being displayed in the window to retrieve a z coordinate. This information is maintained in the programs variables. In one preferred embodiment of the present invention, the program stores the anatomic coordinates for the image which has been previously read from the database, and originally extracted from the DICOM image header. Further, in the preferred embodiment, real-time operation requires that the program maintain all image anatomic coordinates.

In step 506, the x and y points (specified by the mouse) combined with the z coordinate of the image location are converted to anatomic (RAS) coordinates using geometric transformations. The point of selection by the user is referred to as the "locator point." In step 508, the program proceeds sequentially through all the other displayed orientations (windows), and determines the closest image to the selected RAS locator point. As this is the first time the program encounters step 508, no other windows have been updated yet and the program will select a window. Operation then continues with step 510.

In step 510, the closest image is determined by calculating the distance from the locator point's RAS coordinates to the image plane. In one embodiment, the calculation is performed using matrix algebra as specified in "Graphics Gems III" by David Kirk, pp. 223-224, Academic Press Inc. 1992, which is incorporated herein by reference in its entirety. A simplification of this approach determines the distance from the center of the image to the RAS locator point. This simplified distance consists of:

$$D = \text{sqrt}((\text{delta } R)^2 + (\text{delta } A)^2 + (\text{delta } S)^2),$$

where the delta represents the difference between the coordinates in each of the RAS coordinates. The distance is calculated for each image in the stack of similarly oriented images (same axial, coronal, sagittal, or oblique orientation—i.e., parallel planes).

In step 512, the image with the least distance value calculated in step 510 is displayed in the window. Then, the closest point is calculated by calculating the x and y coordinates of the newly displayed image which are closest to the locator point. In one embodiment, the closest point can be determined by calculating the new x and y coordinates in the newly displayed image from the locator RAS points since this point should be very close to the image plane.

In step 514, the program checks to see if all windows have been updated with the appropriate images. If all windows have not been updated, then operation returns to steps 508 until all windows have been synchronized to display images around the corresponding anatomy as identified by the locator RAS point.

As discussed, the present invention also provides the user with the ability to explore anatomical points of interest by updating the screen in a dynamic fashion based on a continuous monitoring of the user's cursor. In a preferred embodiment, static triangulation is applied in real-time as the user drags the mouse with the left mouse button depressed over the locator image. This creates a series of (x, y) locator points and the program synchronizes the images displayed in the other windows with the current location of the mouse position.

Figure 3:
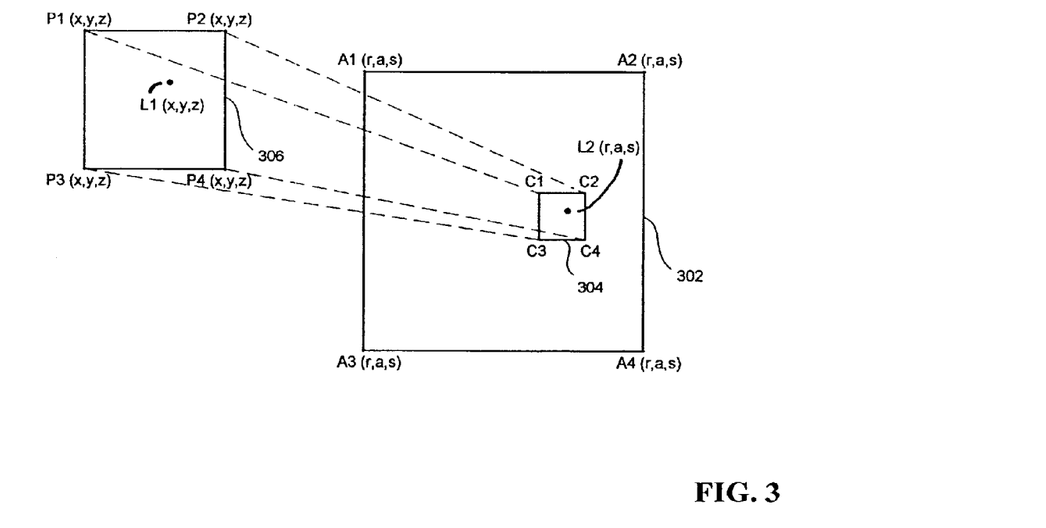
FIG. 3 illustrates the coordinate transformation relationship between a captured image and a displayed portion of the image.

In another embodiment of the present invention, further described with use of FIG. 3, where an image 306 being displayed has been magnified and/or cropped from its original image 302, additional formulas must be used to first determine the "real" image x and y coordinates (see point L2 in FIG. 3) from the window display coordinates (see point L1 in FIG. 3) specified by the cursor position, taking into account the current image offset and the magnification factor:

magFactor=displayWidth/imageClippedWidth;

xImage=xCursor/magFactor+xImageOffset;

yImage=yCursor/magFactor+yImageOffset0; and, zImage=0 (relative to image plane);

where magFactor is the magnification factor; displayWidth is the width of the current window, imageClippedWidth is the width of the clipped image; xImageOffset and yImageOffset are the offsets in x and y, respectively, of the displayed portion of the image; and xImage and yImage are the real x and y coordinates, respectively, that the user has selected with the cursor.

Once the real image x and y coordinates have been determined, the program converts the x, y and z coordinates to RAS coordinates using the xImage and yImage coordinates, and the RAS coordinates of the top left corner (rTL, aTL, sTL), the top right corner (rTR, aTR, sTR), and center (rC, aC, sC) of the image. These represent the anatomic coordinates which correspond to the (0,0,0) position, and the (imageWidth/2, imageHeight/2, 0) positions. Using the following equations, the program can calculate the anatomic coordinates of the locator point (rLP, aLP, sLP) from the image coordinates (xImage, yImage, 0) knowing the 2 sets of 3D points specified previously:

rLP=rTL+(rTR−rTL)*xImage/imageWidth+(rC−(rTR+rTL)/2)*2*yImage/ imageHeight;

aLP=aTL+(aTR−aTL)*xImage/imageWidth+(aC−(aTR+aTL)/2)*2*yImage/ imageHeight; and, sLP=sTL+(sTR−sTL)*xImage/imageWidth+(sC−(sTR+sTL)/2)*2*yImage/ imageHeight The program then calculates the distance to each plane from this point using the center to point distance:

ptToPlaneDist=sqrt((rLP−rC)^2+(aLP−aC)^2+(sLP−sC)^2), where the program will find the image plane with the least ptToPlaneDist and display that image.

Once the appropriate image is displayed, the program determines where to display a corresponding locator point in that image by calculating the closest point in the display's x and y coordinates from the x, y, and z coordinates by performing the inverse calculations with the new image and using the new image's top left, top right, and top center RAS coordinates for these calculations. Finally, the program, draws the point on the image with a small circle so as not to obstruct the anatomy being observed. In another embodiment, a square may be drawn instead of a circle. In yet another embodiment, the shape of the marker may be user selectable, with different sizes and/or transparencies.

Figure 6:
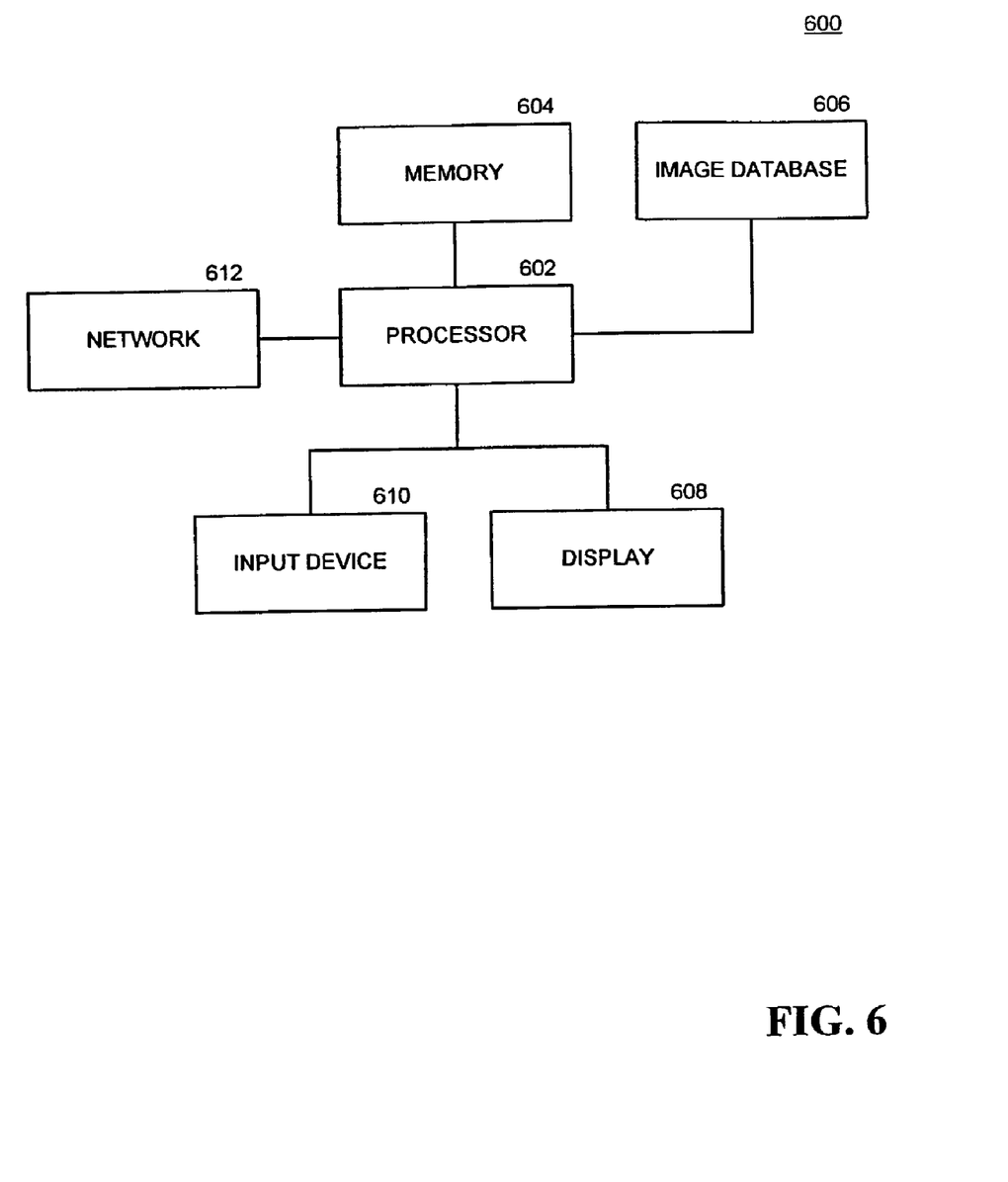
FIG. 6 is a block diagram of a display system configured in accordance with one embodiment of the present invention.

FIG. 6 is a block diagram of a display system 600 configured in accordance with a preferred embodiment of the present invention. Display system 600 includes a processor 602 coupled to a memory 604, image database 606, display 608, input device 610, and a network adapter 612. In a preferred embodiment, processor 602 is a general purpose processor capable of executing program code contained in memory 604.

Memory 604 represents a variety of volatile and non-volatile memories used for the storage of program code and other data necessary for the operation of display system 600. For example, memory 604 may include such non-volatile storage devices as hard disk drives, optical disk drives and tape drives; and volatile storage such as random access memory (RAM). Although the image data used in the operation of the present invention may be stored in memory 604, image database 606 is included in FIG. 6 to emphasize the logical separation of the data contained in image database 606 from the information contained in memory 604. In another embodiment, the information contained in image database 606 may be contained in memory 604.

In a preferred embodiment, database 606 includes an image table, which maintain the relational parameters necessary for making decisions about anatomic locations for each image in an exam. Generally speaking, a relational database is used, and the table structure has been designed to follow closely with the acquisition structure. A patient table contains all information relation to the patient (e.g., name, MRN, birth_date, etc.) An exam table contains information relating to the specific exam such as date, modality, and a pointer (e.g., key) to the patient in the patient table (e.g., pat_key). A series table contains information related specifically to the series acquisition (e.g., orientation, series number, etc.) and a pointer (e.g., key) to the exam table (e.g., exam_key). The image table contains all the parameters required for the image to be displayed and annotated appropriately for diagnosis. A key in the image table points to the series that it belongs to (e.g., ser_key). In this fashion, a patient can have unlimited exams, an exam can have unlimited series, and a series can have unlimited images. Thus, the image table contains the relational parameters necessary for the three-dimensional calculations. Duplicate values are maintained for accuracy checks. Other information maintained in database 606 for each image may include, but is not limited to, the top right point of the image in RAS, specified by (r_tr, a_tr, s_tr); the top left point of the image, specified by (r_tl, a_tl, s_tl); the center of the image, specified by (r_ctr, a_ctr, s_ctr); image width and height; zoom width and height; clipping x offset and clipping y offset; clipping width and height; and x and y pixel sizes. Additionally, the image normal vectors (r_norm, a_norm, s_norm) may also be derived and maintained in the database for easy access. Various combinations of these parameters allow three dimensional calculations for the anatomic triangulation functionality.

Display 608 is used to display images and otherwise provide feedback to the user. Display 608 may be a cathode ray tube-type of display, commonly referred to as a "monitor;" a liquid crystal display; a plasma display; or any other suitable display. The corollary to display 608 is input device 610, which represents one or more input devices such as mice, keyboards, joysticks, and digitizing pads. Input device 610 allows the user to provide the selection signals discussed above, as well as other signals to control display system 600.

In one preferred embodiment, input device 610 includes a mouse having a left button, a middle button and a right button; and a keyboard having a standard US lay-out with a control key, a meta (i.e., a special) key and a shift key. The left button will select the desired point in the anatomy. And the middle mouse button will invert or adjust the window/level (brightness and contrast).

In one embodiment, the following mouse buttons are operational over an image window:

Left: Clicking the left mouse button will locate the desired point in the anatomy. All series associated with the exam will load the closest associated image to the point of reference.

Middle: By dragging the middle mouse button over the image window, the window/level of the image can be adjusted. Left/right motions affect the contrast, and up/down motions affect the brightness. By single clicking the middle mouse button the window/level of the image will be inverted. This only effects the selected image.

Double-click: If the left mouse button is double-clicked, the located point in the anatomy will be temporarily marked on all associated series.

Shift: If the shift key is depressed, then the mouse mode will resemble the text mode. Arrows can be drawn and text can be moved in this mode. The mouse cursor will display a pencil.

Control: If the control key is depressed, then the mouse functions will emulate the print mouse mode. The left mouse button can copy individual images from the active window to the print page, and the middle mouse button will create multiple print pages with all of the images in the selected series. The cursor will display a printer while the control key is depressed.

Meta: If the meta key is depressed, then the magnifying glass mode will be enabled. Move the cursor to different locations to magnify those regions and use the left and middle mouse buttons to increase or decrease the size of the magnified area respectively. The cursor will display a magnifying glass.

In another embodiment, the present invention provides the following functions:

Shift: The shift modifier allows you to magnify or zoom each image. When you have the shift key depressed, each click of the middle mouse button over an image in the print page will magnify that image (or any selected images) by the factor set in the config window. Each additional click will increase the magnifications by this factor. If you press the left mouse button over a point of interest, that point will be magnified as you drag the mouse upward. The magnified point of interest will be centered around the initial selected position. This function will operate on multiple images if they are selected. The cursor will resemble a magnifying glass.

Control: If the control key is depressed, then the mouse functions will change to emulate the select mouse mode allowing you to select individual images. Network adapter 612 provides connectivity to display system 600 to other machines on the same network as display system 600, and can be used to connect display system 600 to the Internet, or any other network such that display system 600 may be used to retrieve and transmit data such as image data, patient profiles, and diagnosis results.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A method comprising the steps of:
   displaying a first image from a first stack of images and a second image from a second stack of images, each stack of images belonging to a different series of image captures for a subject from a particular orientation;
   determining a spatial location of each image in the first and second stacks of images;
   receiving a selection signal for an image in the first stack of images;
   determining a corresponding image in the second stack of images based on the selection signal and the spatial location of the corresponding image; and,
   displaying the corresponding image.

2. The method of claim 1, further comprising the step of receiving the first and second stack of images.

3. The method of claim 1, where the step of determining the corresponding image further comprising the steps of:
   determining a set of anatomical coordinates from the selection signal; and,
   locating the corresponding image in the second stack of images, the corresponding image being an image closest to the set of anatomical coordinates.

4. The method of claim 3, where the step of determining the set of anatomical coordinates comprises the steps of:
   determining a set of image coordinates from the selection signal; and,
   generating the set of anatomical coordinates from the set of image coordinates.

5. The method of claim 4, where the set of anatomical coordinates includes a right coordinate, an anterior coordinate, and a superior coordinate, and the set of image coordinates includes a X coordinate, a Y coordinate, and a Z coordinate, and the step of generating the set of anatomical coordinates from the set of image coordinates comprises the steps of:
   determining the X and Y coordinates from the selection signal; determining the Z coordinate from an image spatial location of the image; and,
   calculating the right, anterior and superior coordinates from the X, Y and Z coordinates.

6. The method of claim 1, further comprising the step of displaying a corresponding location indicator in the corresponding image.

7. The method of claim 1, further comprising the steps of:
   displaying a third stack of images belonging to another series having another particular orientation;
   determining the spatial location of each image in the third stack of images;
   determining a second corresponding image in the third stack of images based on the selection signal and the spatial location of the second corresponding image; and,
   displaying the second corresponding image.

8. A display system comprising:
   a display;
   a processor coupled to the display; and
   a memory coupled to the processor, the memory having computer readable program code stored thereon that, when executed by the processor, will cause the processor to:
     display an image from a first series of images for a subject in a first orientation on the display;
     receive a selection signal directed to the image;
     determine a set of anatomical coordinates from the selection signal;
     locate a corresponding image in a second series of images, the corresponding image being an image closest to the set of anatomical coordinates; and,
     display the corresponding image from the second series of images for the subject in a second orientation on the display based on the selection signal.

9. The display system of claim 8, where the memory further has computer readable program code stored thereon that, when executed by the processor, will cause the processor to receive the first and second series of images.

10. The display system of claim 8, where the memory further has computer readable program code stored thereon that, when executed by the processor, will cause the processor to:
    determine a set of image coordinates from the selection signal; and,
    generate the set of anatomical coordinates from the set of image coordinates.

11. The display system of claim 10, where the set of anatomical coordinates includes a right coordinate, a anterior coordinate, and a superior coordinate and the set of image coordinates includes a X coordinate, a Y coordinate, and a Z coordinate, and the memory further having computer readable program code stored thereon that, when executed by the processor, will cause the processor to:
    determining the X and Y coordinates from the selection signal;
    determining the Z coordinate from an image spatial location of the image; and,
    calculating the right, anterior and superior coordinates from the X, Y and Z coordinates.

12. The display system of claim 8, where the memory further has computer readable program code stored thereon that, when executed by the processor, will cause the processor to display a corresponding location indicator in the corresponding image.

13. The display system of claim 8, the memory further has computer readable program code stored thereon that, when executed by the processor, will cause the processor to display a second corresponding image from a third series of images for the subject in a third orientation on the display based on the selection signal.

14. An apparatus comprising:
    means for displaying a first image from a first stack of images and a second image from a second stack of images, each stack of images belonging to a different series of image captures for a subject from a particular orientation;
    means for determining a spatial location of each image in the first and second stacks of images;
    means for receiving a selection signal for an image in the first stack of images;
    means for determining a corresponding image in the second stack of images based on the selection signal and the spatial location of the corresponding image; and,
    means for displaying the corresponding image.

15. The apparatus of claim 14, further comprising means for receiving the first and second stack of images.

16. The apparatus of claim 14, where the means for determining the corresponding image comprises:
    means for determining a set of anatomical coordinates from the selection signal; and,
    means for locating the corresponding image in the second stack of images, the corresponding image being an image closest to the set of anatomical coordinates.

17. The apparatus of claim 16, where the means for determining the set of anatomical coordinates comprises:
    means for determining a set of image coordinates from the selection signal; and,
    means for generating the set of anatomical coordinates from the set of image coordinates.

18. The apparatus of claim 17, where the set of anatomical coordinates includes a right coordinate, an anterior coordinate, and a superior coordinate, and the set of image coordinates includes a X coordinate, a Y coordinate, and a Z coordinate, and the means for generating the set of anatomical coordinates from the set of image coordinates comprises:
    means for determining the X and Y coordinates from the selection signal;
    means for determining the Z coordinate from an image spatial location of the image; and,
    means for calculating the right, anterior and superior coordinates from the X, Y and Z coordinates.

19. The apparatus of claim 14, further comprising means for displaying a corresponding location indicator in the corresponding image.

20. The apparatus of claim 14, further comprising:
    means for displaying a third stack of images belonging to another series having another particular orientation;
    means for determining the spatial location of each image in the third stack of images;
    means for determining a second corresponding image in the third stack of images based on the selection signal and the spatial location of the second corresponding image; and,
    means for displaying the second corresponding image.

21. A computer readable medium having a computer readable program code contained therein, the computer readable program code comprising:
    computer readable code for displaying a first and second stacks of images, each stack of images belonging to a different series of image for a subject from a particular orientation;
    computer readable code for determining a spatial location of each image in the first and second stacks of images;
    computer readable code for receiving a selection signal for an image in the first stack of images;
    computer readable code for determining a corresponding image in the second stack of images based on the selection signal and the spatial location of the corresponding image; and,
    computer readable code for displaying the corresponding image.

22. The computer readable medium of claim 21, the computer readable program code further comprising computer readable code for receiving the first and second stack of images.

23. The computer readable medium of claim 21, where the computer readable program code for determining the corresponding image further comprising:
    computer readable code for determining a set of anatomical coordinates from the selection signal; and,
    computer readable code for locating the corresponding image in the second stack of images, the corresponding image being an image closest to the set of anatomical coordinates.

24. The computer readable medium of claim 23, where the computer readable program code for determining the set of anatomical coordinates comprises:
    computer readable code for determining a set of image coordinates from the selection signal; and,
    computer readable code for generating the set of anatomical coordinates from the set of image coordinates.

25. The computer readable medium of claim 24, where the set of anatomical coordinates includes a right coordinate, an anterior coordinate, and a superior coordinate, and the set of image coordinates includes a X coordinate, a Y coordinate, and a Z coordinate, and the computer readable program code for generating the set of anatomical coordinates from the set of image coordinates comprises:
    computer readable program code for determining the X and Y coordinates from the selection signal;
    determining the Z coordinate from an image spatial location of the image; and,
    computer readable program code for calculating the right, anterior and superior coordinates from the X, Y and Z coordinates.

26. The computer readable medium of claim 21, further comprising computer readable program code for displaying a corresponding location indicator in the corresponding image.

27. The computer readable medium of claim 21, further comprising:
    computer readable program code for displaying a third stack of images belonging to another series having another particular orientation;
    computer readable program code for determining the spatial location of each image in the third stack of images;
    computer readable program code for determining a second corresponding image in the third stack of images based on the selection signal and the spatial location of the second corresponding image; and,
    computer readable program code for displaying the second corresponding image.

* * * * *